(12) United States Patent
Cho (10) Patent No.: US 11,046,140 B2
(45) Date of Patent: Jun. 29, 2021

(54) REAR SUSPENSION APPARATUS OF VEHICLE

(71) Applicants: HYUNDAI MOTOR COMPANY, Seoul (KR); KIA MOTORS CORPORATION, Seoul (KR)

(72) Inventor: Sung Han Cho, Ansan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 63 days.

(21) Appl. No.: 16/567,621

(22) Filed: Sep. 11, 2019

(65) Prior Publication Data

US 2020/0353785 A1 Nov. 12, 2020

(30) Foreign Application Priority Data

May 7, 2019 (KR) .................. 10-2019-0052789

(51) Int. Cl.
  *B60G 11/08* (2006.01)
  *B60G 9/00* (2006.01)
  (Continued)

(52) U.S. Cl.
  CPC ............. *B60G 11/08* (2013.01); *B60G 9/00* (2013.01); *B60G 11/04* (2013.01);
  (Continued)

(58) Field of Classification Search
  CPC .......... B60G 9/00; B60G 9/006; B60G 11/04; B60G 11/08; B60G 11/10; B60G 21/055; B60G 2200/30; B60G 2200/31; B60G 2202/112; B60G 2202/114; B60G 2204/121; B60G 2204/4502; B60G 2800/012
  See application file for complete search history.

(56) References Cited

U.S. PATENT DOCUMENTS 2,002,459 A * 5/1935 Viviano ................. B60G 11/02
  267/46
2,364,842 A * 12/1944 Feigelson ............... B62D 63/08
  280/124.106

(Continued)

FOREIGN PATENT DOCUMENTS

EP 0253574 A1 1/1988
FR 1293498 A * 5/1962 ............. B60G 11/08
  (Continued)

*Primary Examiner* — Paul N Dickson
*Assistant Examiner* — Daniel M. Keck
(74) *Attorney, Agent, or Firm* — Morgan, Lewis & Bockius LLP (57) ABSTRACT

A rear suspension apparatus of a vehicle includes: a transverse helper leaf spring connected to a rear axle and disposed in a transverse direction; and a first stopper mechanism and a second stopper mechanism contacting the transverse helper leaf spring when the vehicle moves. The rear suspension apparatus is capable of improving riding quality by using a new spring constant value generated by the transverse helper leaf spring when freight is loaded and a vehicle body frame moves downwardly, and restricting rolling movement of the vehicle when rolling is caused, thereby increasing roll stiffness and improving driving stability.

8 Claims, 8 Drawing Sheets

(51) Int. Cl.
    *B60G 11/04*     (2006.01)
    *B60G 11/10*     (2006.01)
    *B60G 21/055*     (2006.01)
    *B60G 11/02*     (2006.01)

(52) U.S. Cl.
    CPC .... *B60G 2200/30* (2013.01); *B60G 2202/112* (2013.01); *B60G 2202/114* (2013.01); *B60G 2204/121* (2013.01); *B60G 2204/4502* (2013.01); *B60G 2300/02* (2013.01); *B60G 2300/14* (2013.01); *B60G 2800/012* (2013.01)

(56) References Cited

U.S. PATENT DOCUMENTS

| | | | | |
|---|---|---|---|---|
| 3,014,736 A * | 12/1961 | Moreno | ................. | B60G 9/02 |
| | | | | 280/124.111 |
| 2013/0154227 A1* | 6/2013 | Lindtner | ................. | B60G 3/28 |
| | | | | 280/124.165 |
| 2016/0059654 A1* | 3/2016 | Takayama | ................ | F16F 9/54 |
| | | | | 267/195 |

FOREIGN PATENT DOCUMENTS

| | | | |
|---|---|---|---|
| JP | S63-030618 A | 2/1988 | |
| JP | H05-278425 A | 10/1993 | |
| JP | 2571883 Y2 | 5/1998 | |
| JP | 3481364 B2 | 12/2003 | |
| KR | 10-2003-0064145 A | 7/2003 | |
| KR | 10-2016-0069842 A | 6/2016 | |
| WO | 2018/187256 A1 | 10/2018 | |
| WO | WO-2019111918 A1 * | 6/2019 | ............ B60G 11/08 |

\* cited by examiner

REAR SUSPENSION APPARATUS OF VEHICLE

CROSS REFERENCE TO RELATED APPLICATION

The present application claims the benefit of priority to Korean Patent Application No. 10-2019-0052789, filed on May 7, 2019 in the Korean Intellectual Property Office, the entire content of which is incorporated herein by reference.

TECHNICAL FIELD

The present disclosure relates to a rear suspension apparatus of a vehicle, and more particularly, to a rear suspension apparatus of a vehicle for improving riding quality and driving stability by using a transverse helper leaf spring applied to a rear axle.

BACKGROUND

A suspension apparatus of a vehicle is an apparatus for preventing damages to the vehicle body or freight and providing good riding quality by preventing vibrations or shocks from a road surface when driving from being delivered directly to a vehicle body.

A rear suspension apparatus used for a small-size or medium-size bus, a truck, or the like includes leaf springs disposed in a longitudinal direction at both left and right sides of the vehicle. Generally, functions of such springs of the vehicle are to absorb shocks generated from the road surface and to support a weight of the vehicle.

The spring basically serves to absorb the shocks but requires a certain level of spring constant (K) value because durability is needed to support the weight of the vehicle.

However, a natural frequency of the vehicle is inversely proportional to a mass and is proportional to the K value, which is the spring constant. Therefore, the larger the K value is, the higher the natural frequency is, and thus the riding quality deteriorates.

Therefore, there is a need for a technique to effectively support the weight of the vehicle and simultaneously improve the riding quality according to a loaded state of freight (e.g., an empty state, a fully loaded state, a half-full loaded state between the empty state and the fully loaded state).

The contents described as the related art have been provided only to assist in understanding the background of the present disclosure and should not be considered as corresponding to the related art known to those having ordinary skill in the art.

SUMMARY

An objective of the present disclosure is to provide a vehicle with a rear suspension apparatus which effectively supports a weight of the vehicle and simultaneously improves riding quality according to a loaded state of freight (e.g., an empty state, a fully loaded state, a half-full loaded state between the empty state and the fully loaded state) by using longitudinal main leaf springs, longitudinal helper leaf springs, and a transverse helper leaf spring applied to a rear axle. Such a rear suspension apparatus can increase roll stiffness of the vehicle to improve driving stability.

According to an exemplary embodiment of the present disclosure, a rear suspension apparatus of a vehicle includes: a transverse helper leaf spring fixed to a rear axle and disposed in a transverse direction of the vehicle; and a first stopper mechanism and a second stopper mechanism installed to be fixed to a vehicle body frame. The first and second stopper mechanisms are in contact with the transverse helper leaf spring when the vehicle body frame moves downwardly or rolls to restrict a movement of the vehicle body frame.

The first stopper mechanism may be positioned at one side of the transverse helper leaf spring and the second stopper mechanism may be positioned at the other side of the transverse helper leaf spring. Each of the first stopper mechanism and the second stopper mechanism may include: a stopper bracket fixedly coupled to the vehicle body frame, and having a stopper part protruding above the one side or the other side of the transverse helper leaf spring; and an anti-roll bracket coupled to the stopper bracket, and protruding below the one side or the other side of the transverse helper leaf spring.

Each of the first stopper mechanism and the second stopper mechanism may further include an upper rubber fixedly coupled to an inner surface of the stopper part facing the transverse helper leaf spring. The upper rubber may be in contact with the transverse helper leaf spring when the vehicle body frame moves downwardly.

Each of the first stopper mechanism and the second stopper mechanism may further include a lower rubber coupled to a top surface of the anti-roll bracket to face the transverse helper leaf spring. The lower rubber may be in contact with the transverse helper leaf spring when the vehicle body frame rolls.

The transverse helper leaf spring may be configured as a multi-plate spring having multiple layers of plate springs stacked on one another.

A spring seat may be fixedly coupled on the rear axle, an upper bracket may be coupled to the spring seat, and a middle portion of the transverse helper leaf spring may be positioned between the spring seat and the upper bracket so that the transverse helper leaf spring may be coupled together with the spring seat and the upper bracket.

The transverse helper leaf spring may include a center pin integrally folioed at a center point thereof in a longitudinal direction of the vehicle body frame, and the center pin may protrude in a vertical direction of the vehicle. When the transverse helper leaf spring is coupled between the spring seat and the upper bracket, the center pin passes through a hole arranged in the spring seat and a hole arranged in the upper bracket.

The rear suspension apparatus may further include longitudinal main leaf springs and longitudinal helper leaf springs disposed along a longitudinal direction of the vehicle body frame. Each of the longitudinal main leaf springs and the longitudinal helper leaf springs may be connected to one side and at another side of the vehicle body frame, and may be fixed to a middle section of the rear axle by means of a U-bolt in the longitudinal direction. When a spring constant value of the longitudinal main leaf springs is defined as "K1", a spring constant value generated by a composite action of the longitudinal main leaf springs and the longitudinal helper leaf springs is defined as "K2", and a spring constant value generated by a composite action of the longitudinal main leaf springs, the longitudinal helper leaf springs, and the transverse helper leaf spring is defined as "K3", a relation between K1, K2, and K3 may be K1<K2<K3.

The rear suspension apparatus may further include longitudinal main leaf springs disposed along a longitudinal direction of the vehicle body frame. Each of the longitudinal main leaf springs may be connected to one side and at another side of the vehicle body frame, and may be fixed to a middle section of the rear axle by means of a U-bolt in a longitudinal direction. When a spring constant value of the longitudinal main leaf springs is defined as "K1", and a spring constant value generated by a composite action of the longitudinal main leaf springs and the transverse helper leaf spring is defined as "K4", a relation between K1 and K4 may be K1<K4.

DETAILED DESCRIPTION

Hereinafter, a rear suspension apparatus of a vehicle according to a preferred embodiment of the present disclosure will be described with reference to the accompanying drawings.

As shown in FIGS. 1 to 7, the rear suspension apparatus according to exemplary embodiments of the present disclosure may include: longitudinal main leaf springs 10 and longitudinal helper leaf springs 20 disposed at left and right sides of a vehicle and extending in a longitudinal direction (L) of the vehicle. Each of the longitudinal main leaf springs 10 and the longitudinal helper leaf springs 20 may be connected to one side (e.g., a front end of the vehicle) and another side (e.g., a rear end of the vehicle) of a vehicle body frame 1, and may be installed to be fixed to a middle section of a rear axle 5 by means of a U-bolt 3 in the longitudinal direction. The rear suspension apparatus may further include a transverse helper leaf spring 30 fixed to the rear axle 5 and disposed in a transverse direction (T) of the vehicle, which is an axial direction of the rear axle 5, and a first stopper mechanism 40 and a second stopper mechanism 50 installed to be fixed to the vehicle body frame 1. The first and second stopper mechanisms 40 and 50 may be in contact with the transverse helper leaf spring 30 when the vehicle body frame 1 moves downwardly or rolls to restrict a movement of the vehicle body frame 1.

All of the longitudinal main leaf springs 10, the longitudinal helper leaf springs 20, and the transverse helper leaf spring 30 may be configured as a multi-plate spring having multiple layers of plate springs stacked on one another.

The first stopper mechanism 40 and the second stopper mechanism 50 may be fixedly coupled respectively to a left side and a right side of the vehicle body frame 1 and positioned respectively at one side (left end) and the other side (right end) of the transverse helper leaf spring 30. The first stopper mechanism 40 and the second stopper mechanism 50 may include the same components.

Figure 1:
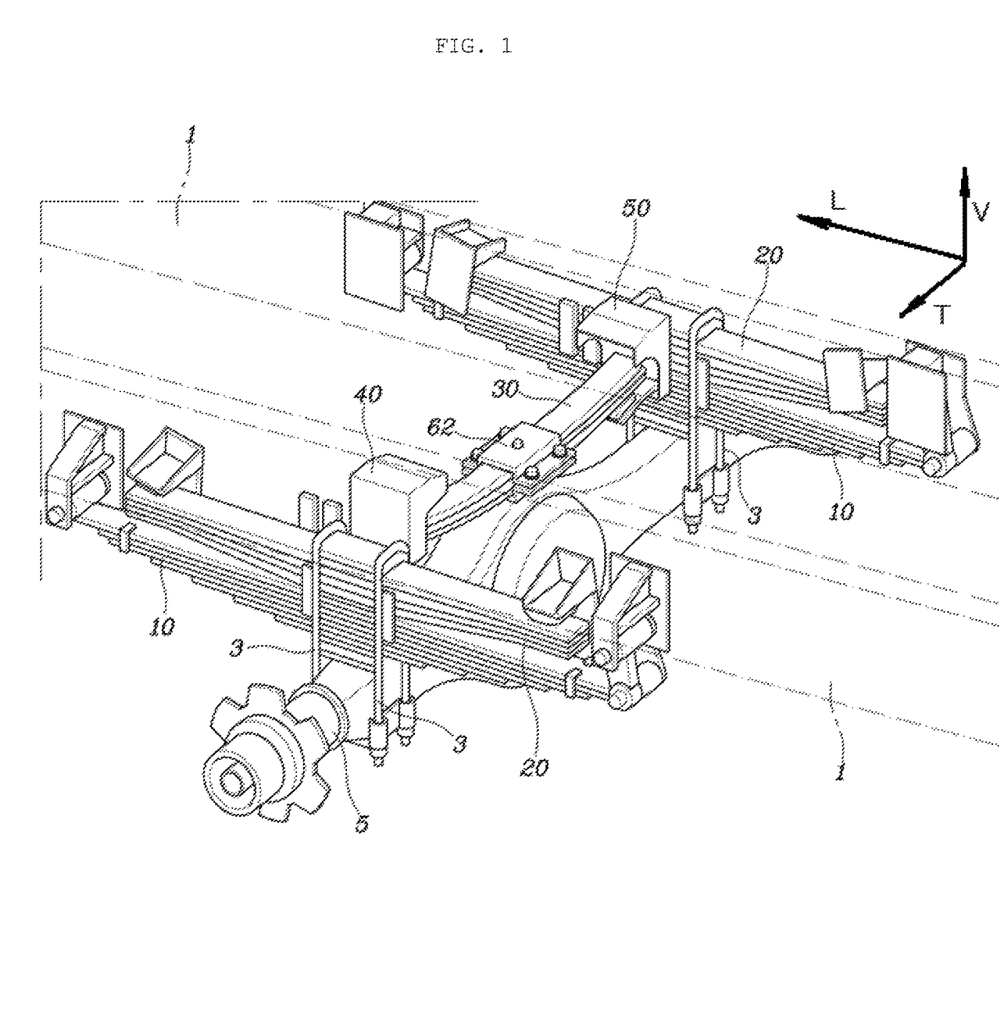
FIG. 1 is a perspective view illustrating a rear suspension apparatus of a vehicle according to an exemplary embodiment of the present disclosure.
Figure 2:
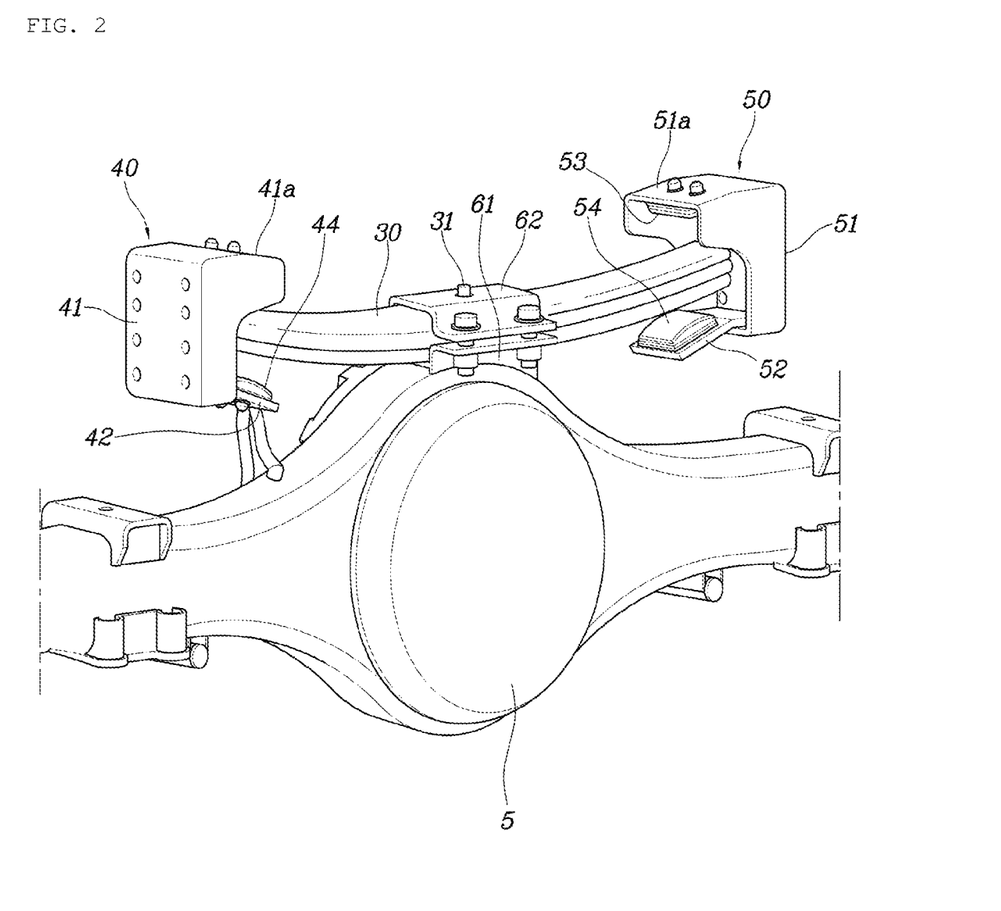
FIG. 2 is a perspective view illustrating a portion in which the transverse helper leaf spring is coupled in FIG. 1.
Figure 3:
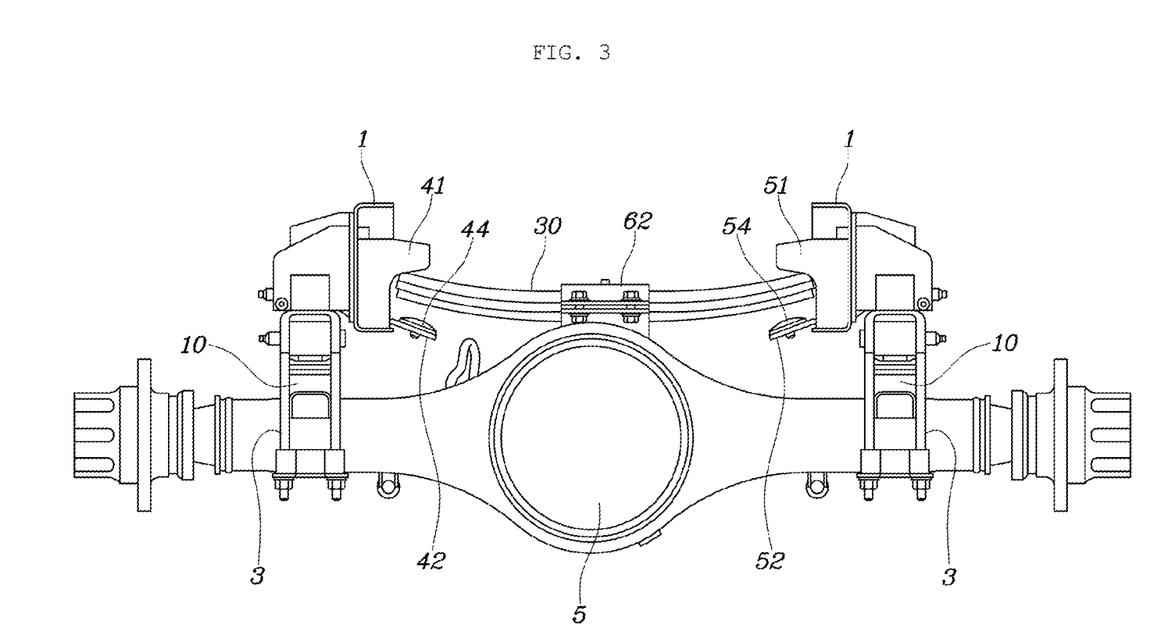
FIG. 3 is a front view of FIG. 2.
Figure 4:
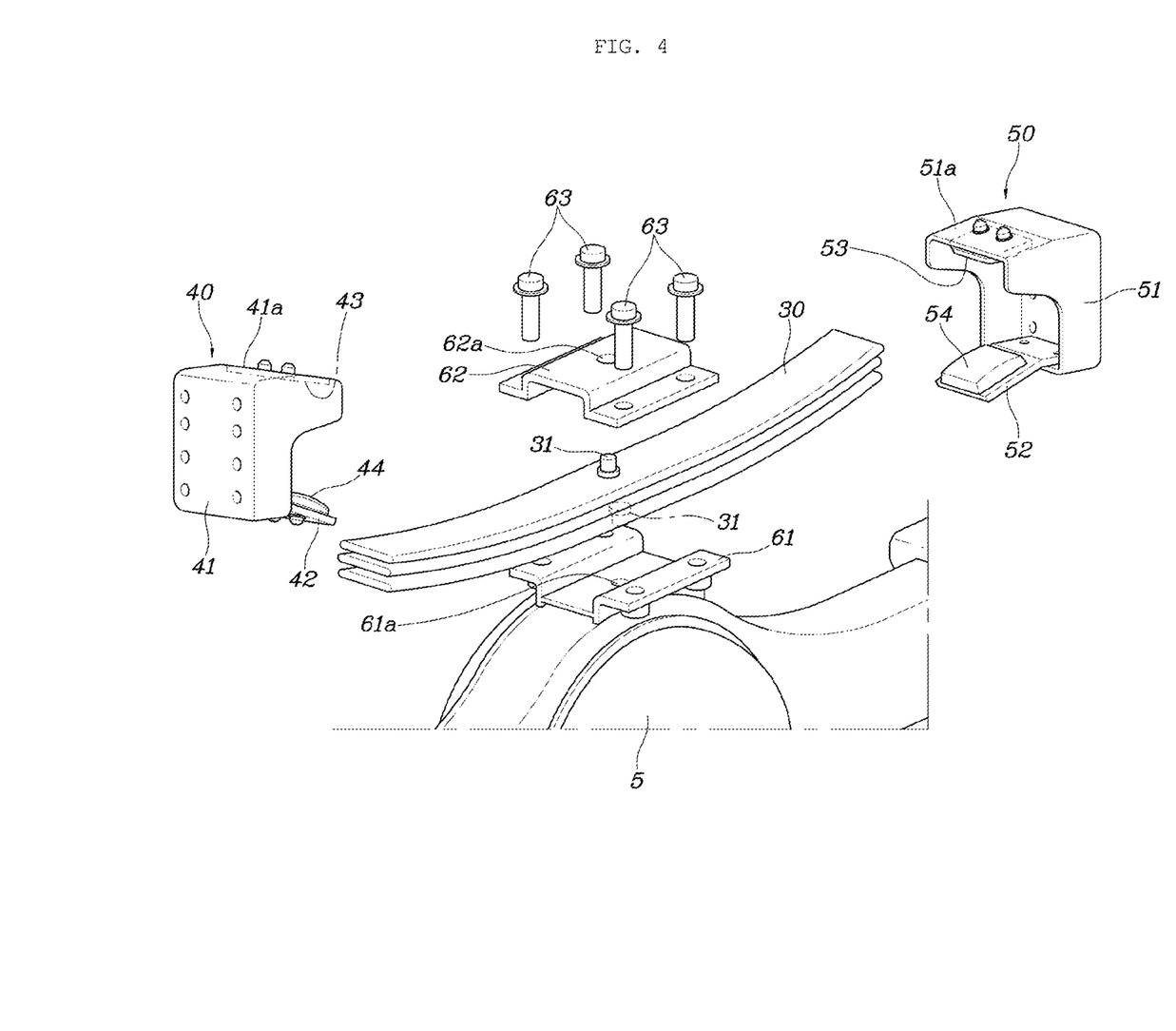
FIG. 4 is an exploded perspective view of FIG. 2.

Each of the first stopper mechanism 40 and the second stopper mechanism 50 may include a stopper bracket 41 or 51 fixedly coupled to the vehicle body frame 1, with a stopper part 41a or 51a protruding above the one side (left end) or the other side (right end) of the transverse helper leaf spring 30, an anti-roll bracket 42 or 52 coupled to the stopper bracket 41 or 51 and protruding below the one side (left end) or the other side (right end) of the transverse helper leaf spring 30.

Each of the first and second stopper mechanisms 40 and 50 may further include an upper rubber 43 or 53 fixedly coupled to an inner surface of the stopper part 41a or 51a facing the transverse helper leaf spring 30 and being in contact with the transverse helper leaf spring 30 when the vehicle body frame 1 moves downwardly, and a lower rubber 44 or 54 coupled to a top surface of the anti-roll bracket 42 or 52 to face the transverse helper leaf spring 30 and being in contact with the transverse helper leaf spring 30 when the vehicle body frame 1 rolls.

The upper rubber 43 or 53 and the lower rubber 44 or 54 prevent generation of noise and absorb shocks when contacting the transverse helper leaf spring 30, thereby improving the durability of the system.

According to an exemplary embodiment of the present disclosure, a spring seat 61 may be fixedly coupled on the rear axle 5, an upper bracket 62 is coupled to the spring seat 61 by means of a plurality of bolts 63, and a middle portion of the transverse helper leaf spring 30 is positioned between the spring seat 61 and the upper bracket 62 so that the transverse helper leaf spring 30 is coupled together with the spring seat 61 and the upper bracket 62.

According to an exemplary embodiment of the present disclosure, the transverse helper leaf spring 30 may include a center pin 31 integrally folioed at a center point thereof in a longitudinal direction (L), and the center pin 31 protrudes in a vertical direction (V) of the vehicle. When the transverse helper leaf spring 30 is coupled between the spring seat 61 and the upper bracket 62, the center pin 31 passes through a hole 61a foamed in the spring seat 61 and a hole 62a foamed in the upper bracket 62, thereby making it possible to fix a position of the transverse helper leaf spring 30 and thus to prevent the transverse helper leaf spring 30 from being moved in the transverse direction.

According to an exemplary embodiment of the present disclosure, when a spring constant value of the longitudinal main leaf springs 10 is defined as K1, a spring constant value generated by a composite action of the longitudinal main leaf springs 10 and the longitudinal helper leaf springs 20 is defined as K2, and a spring constant value generated by a composite action of the longitudinal main leaf springs 10, the longitudinal helper leaf springs 20, and the transverse helper leaf spring 30 is defined as K3, a relation between K1, K2, and K3 may be K1<K2<K3.

In an empty state of the loaded state of freight, vertical movement of the rear axle 5 may be controlled by only using elastic forces of the longitudinal main leaf springs 10. The spring constant value generated at this time is K1, which the lowest spring constant value.

In a half-full loaded state, the vehicle body frame 1 may be further lowered than that in the empty state due to the load weight. At this time, both sides (both ends) of the longitudinal helper leaf springs 20 may be in contact with stoppers, and the spring constant value K2 is generated by the composite action of the longitudinal main leaf springs 10 and the longitudinal helper leaf springs 20.

In a fully loaded state, the vehicle body frame 1 may be further lowered than that in the half-full loaded state, and both sides (both ends) of the transverse helper leaf spring 30 may be in contact with the stopper brackets 41 and 51. At this time, the spring constant value K3 is generated by the composite action of the longitudinal main leaf springs 10, the longitudinal helper leaf springs 20, and the transverse helper leaf spring 30.

Hereinafter, an operation of the rear suspension apparatus according to an exemplary embodiment of the present disclosure will be described.

The rear suspension apparatus according to an exemplary embodiment of the present disclosure may include longitudinal main leaf springs 10, longitudinal helper leaf springs 20, and a transverse helper leaf spring 30.

Figure 5:
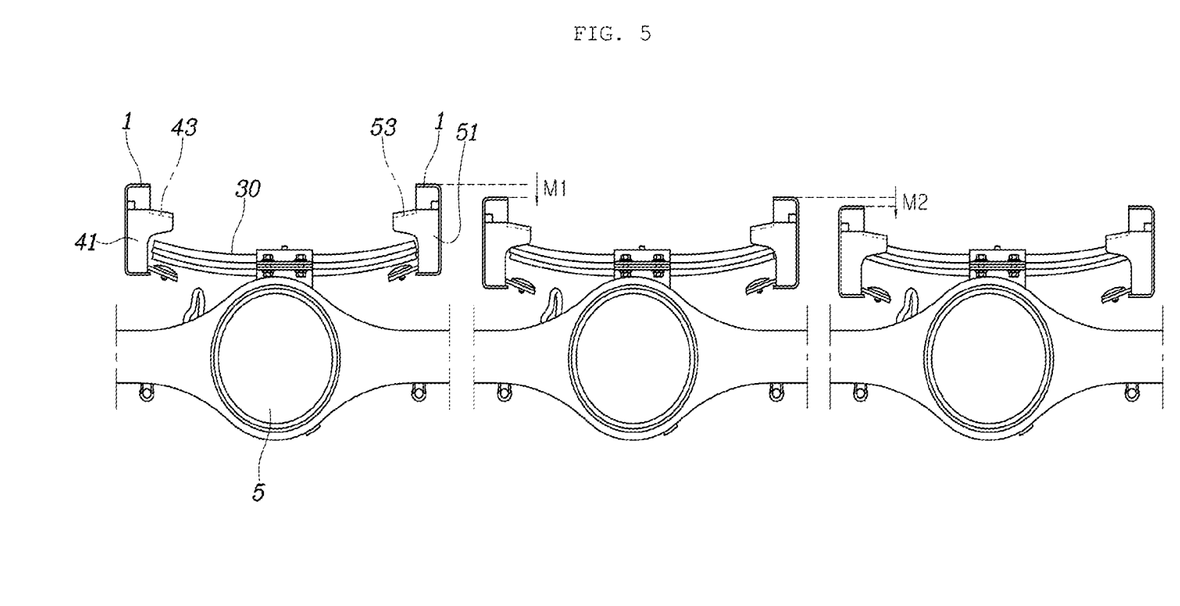
FIG. 5 is a view for illustrating operational processes in an empty state, in a half-full loaded state, and in a fully loaded state.

In FIG. 5, the figure on the left side may describe an empty state of the loaded state of freight, the figure on the right side may describe a fully loaded state, and the figure in the middle may describe a half-full loaded state between the empty state and the fully loaded state.

In the empty state, vertical movement of the rear axle 5 may be controlled by using elastic forces of the longitudinal main leaf springs 10 having the lowest spring constant value. At this time, K1, which is the lowest spring constant value, is generated.

In the half-full loaded state, vertical movement of the rear axle 5 may be controlled by using elastic forces of the longitudinal helper leaf springs 20. At this time, the spring constant value K2 is generated by the composite action of the longitudinal main leaf springs 10 and the longitudinal helper leaf springs 20.

In the half-full loaded state, the vehicle body frame 1 may be further lowered than that in the empty state due to the load weight (arrow M1). Both in the empty state and in the half-full loaded state, both sides (both ends) of the transverse helper leaf spring 30 may be maintained to not be in contact with the upper rubbers 43 and 53 coupled respectively to the stopper brackets 41 and 51.

When the vehicle becomes a fully loaded state from the half-full loaded state by applying a larger load weight thereto, the vehicle body frame 1 may be further lowered (arrow M2), and accordingly the both sides (both ends) of the transverse helper leaf spring 30 are eventually brought into contact with the upper rubbers 43 and 53 coupled respectively to the stopper brackets 41 and 51. From this time, K3, which is a new spring constant value, may be generated by the composite action of the longitudinal main leaf springs 10, the longitudinal helper leaf springs 20, and the transverse helper leaf spring 30.

Therefore, the new spring constant value K3 enables the spring constant value K2, which is an existing high value, to be subdivided, thereby making it possible to effectively support the weight of the vehicle according to the loaded state of freight (the empty state, the fully loaded state, the half-full loaded state between the empty state and the fully loaded state) and to simultaneously improve the riding quality.

In the conventional configuration including only longitudinal main leaf springs and longitudinal helper leaf springs, the spring constant value is optimal only in the empty state or in the fully loaded state. However, in a situation in which the mass is low and the spring constant value is high, i.e., the half-full loaded state, a natural frequency rapidly increases and thus riding quality greatly deteriorates.

The rear suspension apparatus according to exemplary embodiments of the present disclosure may effectively support the weight of the vehicle according to the loaded state of freight (e.g., the empty state, the fully loaded state, the half-full loaded state between the empty state and the fully loaded state), and simultaneously improve the riding quality by lowering the existing spring constant value K2 generated by the longitudinal helper leaf springs 20 and making the new spring constant value K3 generated by the transverse helper leaf spring 30 so that the spring constant value may be optimal in the half-full loaded state (i.e., ½ GVW, Gross Vehicle Weight), which is inevitably generated when freight is loaded.

Figure 6:
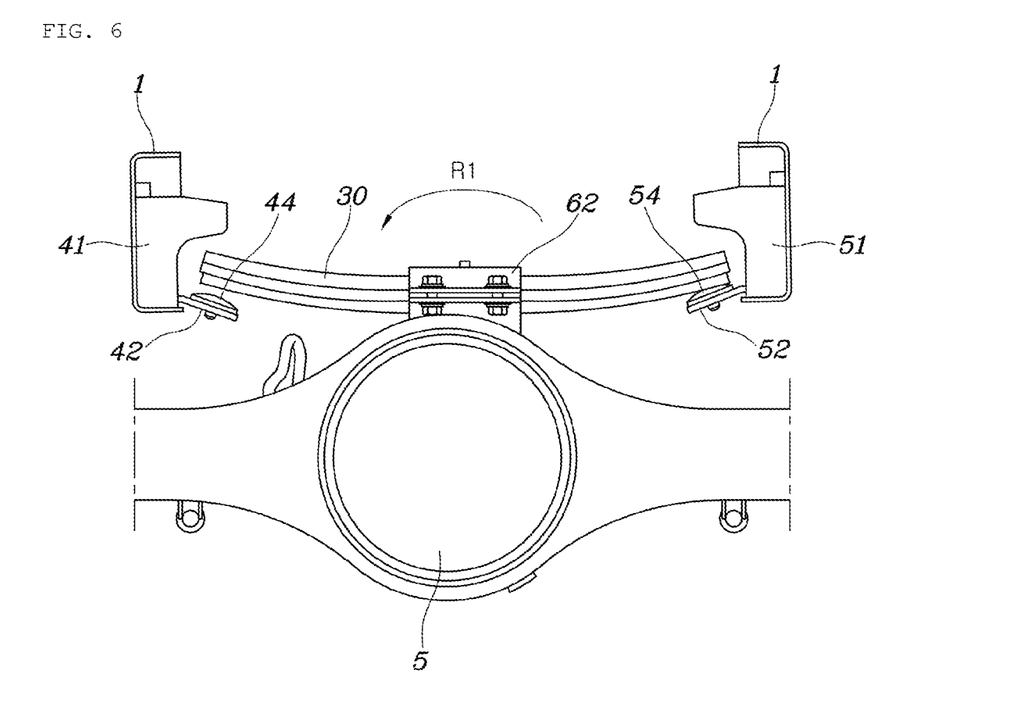
FIGS. 6 and 7 are views for illustrating operational processes when a vehicle rolls.
Figure 7:
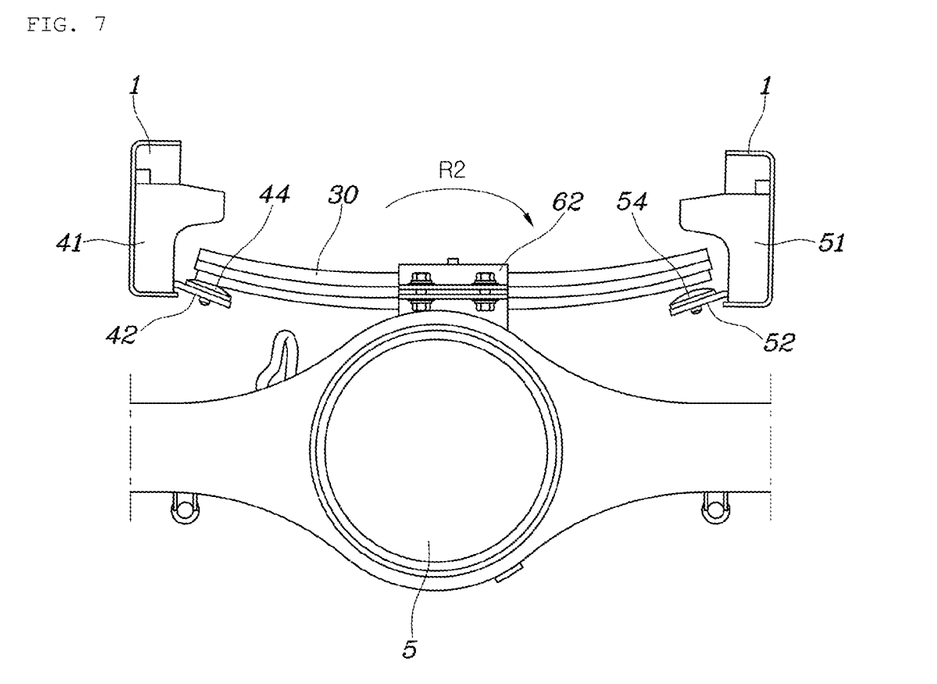

According to exemplary embodiments of the present disclosure, FIG. 6 illustrates a situation in which the vehicle body frame 1 rolls in a counterclockwise direction around a roll center due to a lateral force acting on the vehicle (arrow R1), and FIG. 7 illustrates a situation in which the vehicle body frame 1 rolls in a clockwise direction (arrow R2). At the time of roll movement of the vehicle, the vehicle body frame 1 rotates and one side (left end) or the other side (right end) of the transverse helper leaf spring 30 is brought into contact with one of the lower rubbers 44 and 54 coupled respectively to the anti-roll brackets 42 and 52, so that the roll movement may be restricted and, as a result, roll stiffness may increase and driving stability may improve.

Figure 8:
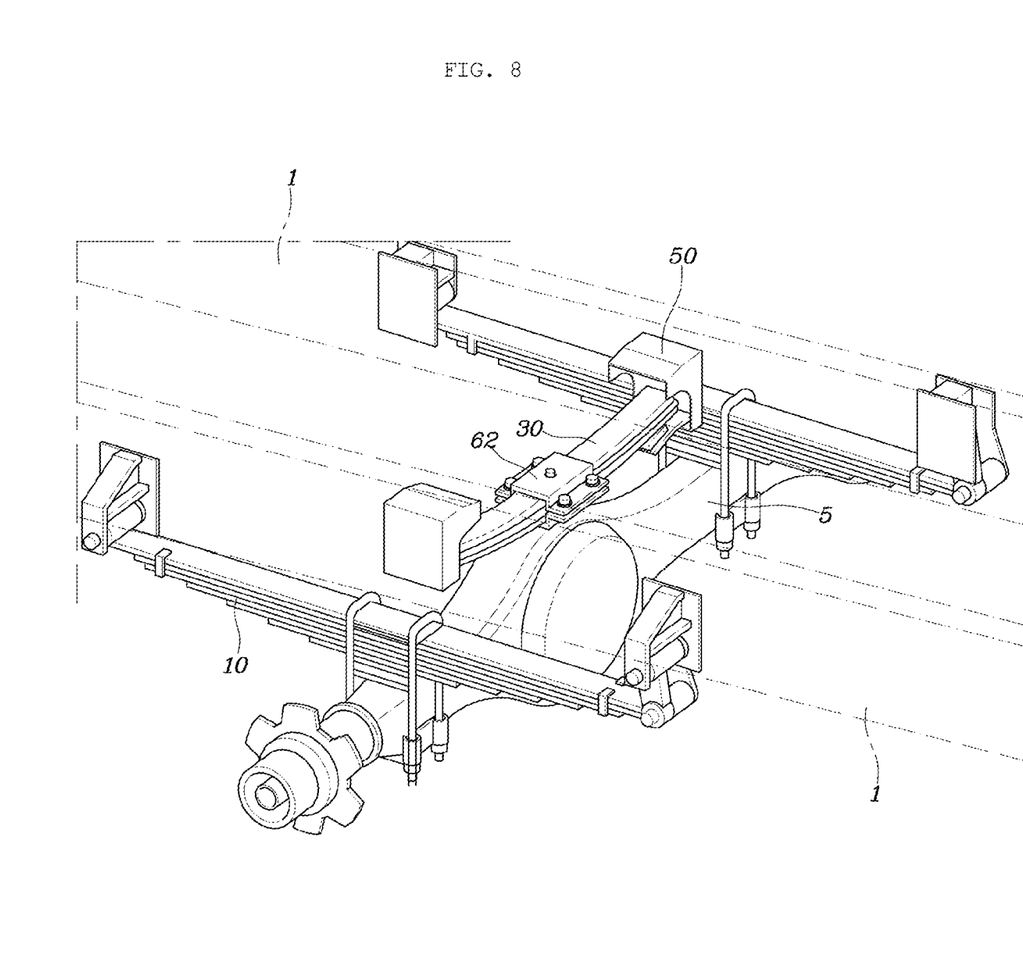
FIG. 8 is a view illustrating another exemplary embodiment of a rear suspension apparatus of a vehicle.

In case of a light-weight truck or a mini-bus which is less likely to be heavily weighted, a rear suspension apparatus may include longitudinal main leaf springs 10 and a transverse helper leaf spring 30 without longitudinal helper leaf springs, as shown in FIG. 8.

At this time, a spring constant value of the longitudinal main leaf springs 10 may be defined as K1, and a spring constant value generated by a composite action of the longitudinal main leaf springs 10 and the transverse helper leaf spring 30 may be defined as K4. A relation between K1 and K4 may be K1<K4. The newly generated spring constant value K4 may also make it possible to improve the riding quality, and restrict the roll movement and thus improve the driving stability.

As described above, the rear suspension apparatus according to an exemplary embodiment of the present disclosure includes a transverse helper leaf spring 30 connected to a rear axle 5 and disposed in a transverse direction, and a first stopper mechanism 40 and a second stopper mechanism 50 contacting the transverse helper leaf spring 30 when the vehicle moves. By using the new spring constant value generated by the transverse helper leaf spring 30 when the freight is loaded and the vehicle body frame 1 moves downwardly, the rear suspension apparatus may effectively support the weight of the vehicle according to the loaded state of the freight (the empty state, the fully loaded state, the half-full loaded state between the empty state and the fully loaded state) and simultaneously improve the riding quality.

In addition, the present disclosure is advantageous in that when rolling is caused by a lateral force acting on the vehicle, the rolling movement of the vehicle may be restricted by using the transverse helper leaf spring 30 and the first and second stopper mechanisms 40 and 50, and thus the roll stiffness may increase and the driving stability may improve.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:
1. A rear suspension apparatus of a vehicle, comprising:
a transverse helper leaf spring fixed to a rear axle and disposed in a transverse direction of the vehicle; and
a first stopper mechanism and a second stopper mechanism installed to be fixed to a vehicle body frame, wherein the first and second stopper mechanisms are in contact with the transverse helper leaf spring when the vehicle body frame moves downwardly or rolls to restrict a movement of the vehicle body frame, the first stopper mechanism is positioned at one side of the transverse helper leaf spring and the second stopper mechanism is positioned at the other side of the transverse helper leaf spring, and each of the first stopper mechanism and the second stopper mechanism includes:

a stopper bracket fixedly coupled to the vehicle body frame, and having a stopper part protruding above the one side or the other side of the transverse helper leaf spring; and an anti-roll bracket fixedly coupled to the stopper bracket, and protruding below the one side or the other side of the transverse helper leaf spring.

2. The rear suspension apparatus of claim 1, wherein each of the first stopper mechanism and the second stopper mechanism further includes an upper rubber fixedly coupled to an inner surface of the stopper part facing the transverse helper leaf spring, the upper rubber being in contact with the transverse helper leaf spring when the vehicle body frame moves downwardly.

3. The rear suspension apparatus of claim 1, wherein each of the first stopper mechanism and the second stopper mechanism further includes a lower rubber coupled to a top surface of the anti-roll bracket to face the transverse helper leaf spring, the lower rubber being in contact with the transverse helper leaf spring when the vehicle body frame rolls.

4. The rear suspension apparatus of claim 1, wherein the transverse helper leaf spring is configured as a multi-plate spring having multiple layers of plate springs stacked on one another.

5. The rear suspension apparatus of claim 1, wherein a spring seat is fixedly coupled on the rear axle, an upper bracket is coupled to the spring seat, and a middle portion of the transverse helper leaf spring is positioned between the spring seat and the upper bracket so that the transverse helper leaf spring is coupled together with the spring seat and the upper bracket.

6. The rear suspension apparatus of claim 5, wherein the transverse helper leaf spring includes a center pin integrally formed at a center point thereof in a longitudinal direction of the vehicle body frame, the center pin protruding in a vertical direction of the vehicle, and when the transverse helper leaf spring is coupled between the spring seat and the upper bracket, the center pin passes through a hole arranged in the spring seat and a hole arranged in the upper bracket.

7. The rear suspension apparatus of claim 1, further comprising longitudinal main leaf springs and longitudinal helper leaf springs disposed along a longitudinal direction of the vehicle body frame, wherein each of the longitudinal main leaf springs and the longitudinal helper leaf springs is connected to one side and another side of the vehicle body frame, and is fixed to a middle section of the rear axle by means of a U-bolt in the longitudinal direction, wherein when a spring constant value of the longitudinal main leaf springs is defined as "K1", a spring constant value generated by a composite action of the longitudinal main leaf springs and the longitudinal helper leaf springs is defined as "K2", and a spring constant value generated by a composite action of the longitudinal main leaf springs, the longitudinal helper leaf springs, and the transverse helper leaf spring is defined as "K3", a relation between K1, K2, and K3 is K1<K2<K3.

8. The rear suspension apparatus of claim 1, further comprising longitudinal main leaf springs disposed along a longitudinal direction of the vehicle body frame, wherein each of the longitudinal main leaf springs is connected to one side and at another side of the vehicle body frame, and is fixed to a middle section of the rear axle by means of a U-bolt in the longitudinal direction, wherein when a spring constant value of the longitudinal main leaf springs is defined as "K1", and a spring constant value generated by a composite action of the longitudinal main leaf springs and the transverse helper leaf spring is defined as "K4", a relation between K1 and K4 is K1<K4.

* * * * *